UNITED STATES PATENT OFFICE.

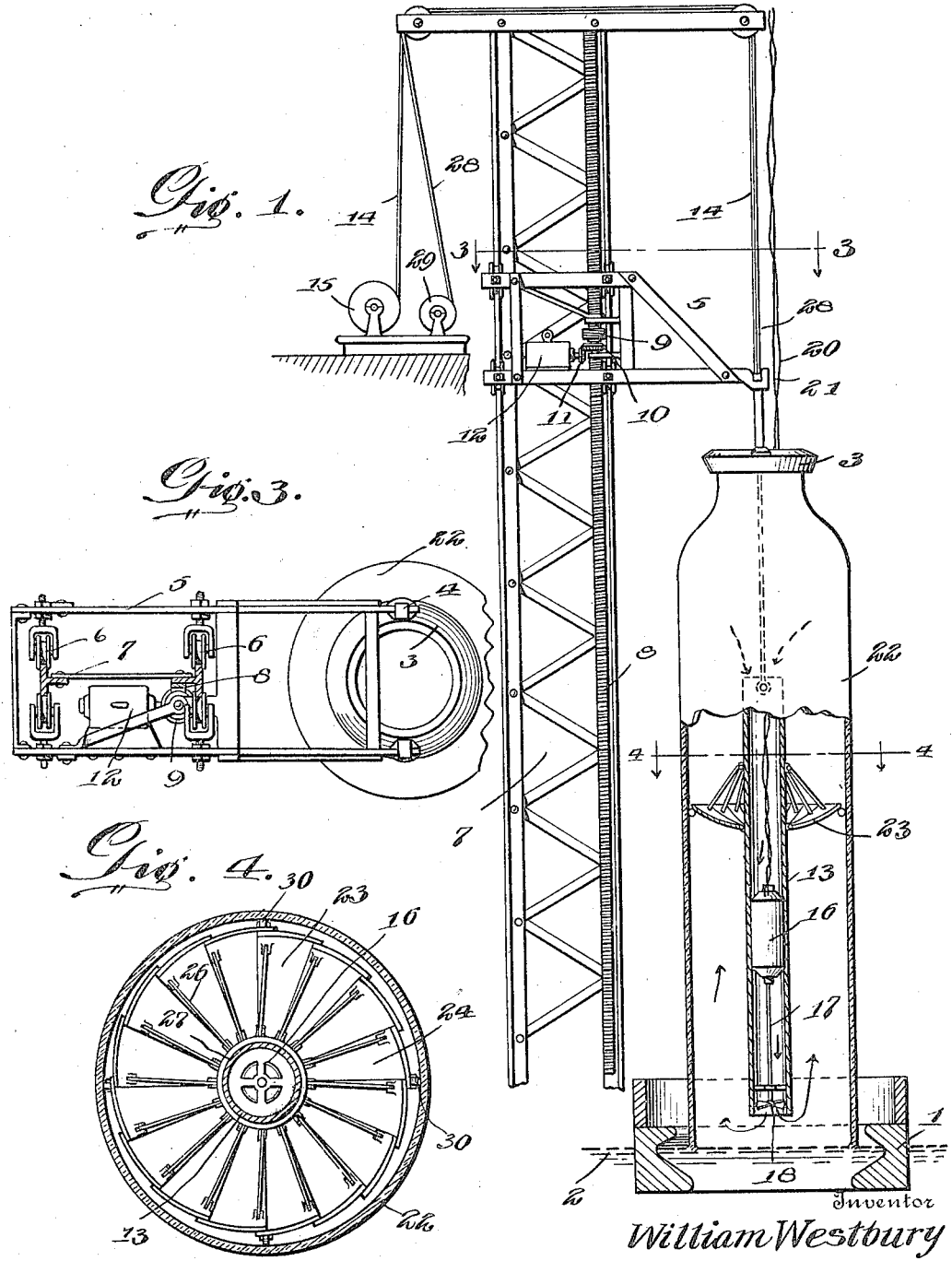

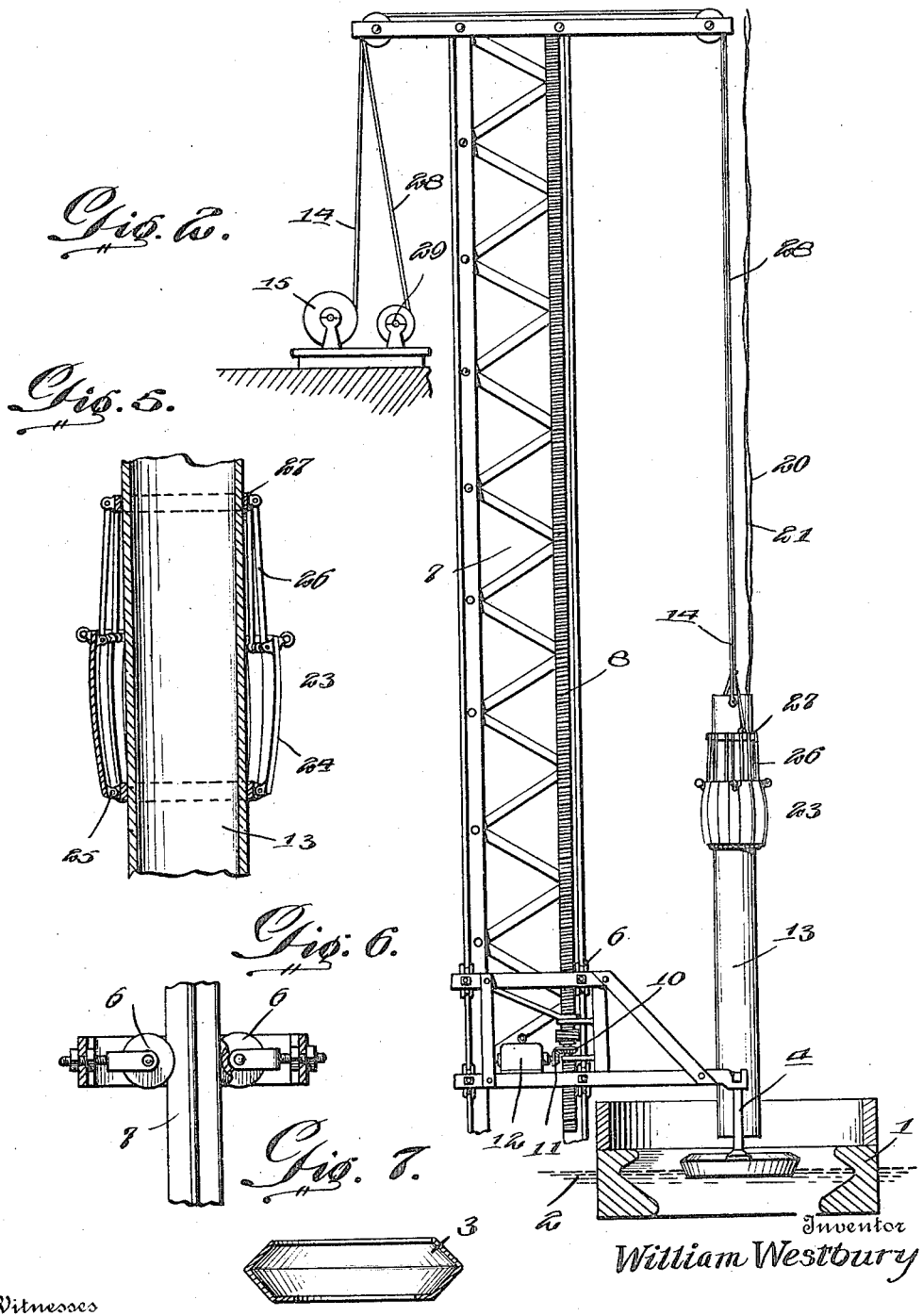

WILLIAM WESTBURY, OF OKMULGEE, OKLAHOMA, ASSIGNOR TO L. S. SKELTON, OF OKMULGEE, OKLAHOMA.

APPARATUS FOR DRAWING GLASS CYLINDERS.

1,236,241.  Specification of Letters Patent.  Patented Aug. 7, 1917.

Application filed January 26, 1916. Serial No. 74,474.

*To all whom it may concern:*

Be it known that I, WILLIAM WESTBURY, a citizen of the United States, residing at Okmulgee, in the county of Okmulgee and State of Oklahoma, have invented new and useful Improvements in Apparatus for Drawing Glass Cylinders, of which the following is a specification.

This invention relates to apparatus for drawing glass cylinders for the production of window glass, and particularly to an apparatus whereby cylinders of maximum length and diameter and free from wrinkles and similar defects, due to pulsations of air within the cylinder as it is being drawn, may be easily and rapidly drawn in a uniformly excellent manner.

In the art of drawing glass cylinders it has been the experience of all machine-glass manufacturers that when an attempt is made to draw a cylinder of large diameter the volume of air contained in such cylinder causes pulsations, varying in number and amplitude according to the diameter of the cylinder. These pulsations, which are due to variations of temperature and pressure within the cylinder, cause defects, such as wrinkles, stone and block marks, which are developed when the cylinder is split up into flattening lengths and flattened into sheets, upon the attempt of the flattener to work out the imperfections and produce a sheet free from surface irregularities. As a result, a large amount of window glass of inferior quality is produced whenever it is attempted to increase the rate of production by drawing cylinders of more than ordinary length and diameter. It is the general custom of machine-made window-glass manufacturers to draw a cylinder which is usually about 20½″ in diameter in single strength to from 22″ to 24″ in double strength, but even with these comparatively restricted sizes air pulsations and consequent manufacturing defects occur, so that the drawing capacity of every drawing apparatus is limited for the production of glass of good quality. Inasmuch as the producing capacity of every drawing apparatus is dependent upon the size of cylinder, in point of both diameter and length, which may be drawn without producing imperfections, it is desirable to increase the size of the cylinder to the highest possible degree consistent with the production of good quality glass, but with the processes and apparatus hitherto in use it has been found impractical to draw cylinders of a length greater than thirty feet and of a greater diameter than twenty-four inches, in general practice, and at the same time make glass sheets of first class quality.

The object of the present invention is to provide an apparatus whereby glass cylinders of much greater length and diameter can be drawn than is possible with the apparatus in general use without impairing the quality of the glass over that ordinarily produced.

A further object of the invention is to provide an apparatus by means of which the air supplied to the cylinder during the draw may be kept at proper temperatures and pressure to produce a cylinder free from pulsations and other defects of the character mentioned.

In the accompanying drawings showing one form of apparatus for carrying my invention into practical effect,—

Figure 1 is a view in elevation, partly in section, of a drawing mechanism showing a cylinder in process of being drawn.

Fig. 2 is a view similar to Fig. 1, with the cylinder omitted, and showing the parts as they appear at the moment of starting a draw.

Fig. 3 is an enlarged sectional plan view on the line 3—3 of Fig. 1.

Fig. 4 is a similar view on the line 4—4 of Fig. 1.

Fig. 5 is an enlarged detail section through a portion of the air supply tube and showing the collapsible guide in collapsed condition.

Fig. 6 is a detail view showing a portion of the frame work and carriage.

Fig. 7 is a sectional view through the bait.

Referring to the drawings, 1 designates a drawing ring or other glass receptacle containing a charge of glass 2 from which the cylinder is to be drawn. The drawing mechanism for drawing the cylinder comprises a bait 3 comprising a hollow body having openings in its top and bottom walls, which bait is supported by hanger arms 4 from a carriage 5 provided with grooved wheels or rollers 6 arranged to travel upon the rail flanges of a supporting and guide frame 7 arranged in suitable proximity to the drawing station. Fixed to the frame is a toothed bar or rack 8 with which meshes a worm gear 9 revolubly mounted on the carriage and receiving motion from a beveled gear 10 driven by a similar gear 11 on the shaft of an electric motor 12. This motor is of the reversible, variable speed type and is arranged in an electric circuit governed by a switch and a rheostat at the operator's station, by means of which the motor shaft may be driven in either direction to raise or lower the carriage and to vary the speed of the motor and carriage as desired.

Designed for coöperation with the open top bait 3 is a vertically arranged air supply tube 13 which is suspended at its upper end by a cable 14 from the head portion of the frame 7, said cable extending over suitable pulleys to a winding drum 15, which may be operated by hand or power, for the purpose of raising and lowering the tube. Disposed within this tube is an electrical motor 16 also of the reversible, variable speed type and controlled from the operator's station similarly to the motor 12, said motor 16 having its armature shaft 17 depending to a point adjacent the lower end of the tube 13, in its adjusted position illustrated in Fig. 1, and carrying a suction and exhaust fan or similar fluid pressure suction and discharge device 18. The motor casing 16 is suitably secured within the tube 13 and the shaft 17 is journaled in a bearing member 18 therein, and conductors 20 and 21 lead from the motor to a suitable source of electrical energy for supplying current to the motor for the purpose of driving the fan, which, as hereinbefore stated, may be operated at variable speeds to regulate its suction and force power.

In the process of drawing a glass cylinder 22 from the charge of glass 2 in the receptacle 1, the drawing tool is first lowered until the open top bait is partially submerged to a desired depth in the molten glass and the bait is then moved upward to a point about six inches above the surface of the glass, which is chilled and forms in the ordinary manner the neck and cap of the cylinder. While the bait is in this position the air supply tube 13 is lowered until its lower end extends through the hollow bait to within about four inches of the surface of the molten glass, whereupon the fan is started into action to draw air downward through the tube 13 and force it outward at the bottom of the tube into the space between the tube and the lower end of the cylinder 22, the pressure being regulated to expand or distend the cylinder to its desired diameter.

The cylinder having been expanded to the desired degree the bait is elevated by the operation of the carriage to continue the drawing action, which progresses regularly and uniformly until the cylinder is drawn out to its full length, the cylinder being finally detached from the bait and molten glass in any of the usual ways and cut into lengths for the flattening operation. As the cylinder is being drawn the fan is continued in operation and thus sucks air downward from above. This air so drawn downward is cooler than the air contained within the bottom of the cylinder and on its passage cools the tube and motor and thence passes outward from the lower end of the tube above the surface of the glass into the lower portion of the cylinder, where it meets the warmer air and is expanded, thus cooling such warmer air and at the same time maintaining a uniform pressure at the bottom of the cylinder. The air flowing from the tube and commingling with the air in the bottom of the cylinder then arises, slowly and uniformly owing to the cooling action whereby its temperature is reduced to a degree sufficient to keep the air column within the cylinder at temperatures corresponding substantially to the temperatures of the walls of the cylinder at progressive distances in the draw from the surface of the molten glass, whereby sudden and widely varying extremes of temperature and pressure are avoided and a uniformly decreasing variation of pressure between the bottom and top of the cylinder established, by means of which pulsations and other objectionable actions causing wrinkling and other defects of the character noted are prevented and glass of first class quality produced. It will of course be understood that the operator can at all times overcome any tendency of the cylinder tapering out as it is drawn by increasing or decreasing the volume of air supplied, and it has been found in practice that this method of supplying air to the cylinder will practically at all times keep the cylinder distended with practically no pressure contained therein other than the direct pressure caused by the expansion of the volume of air blown upon the surface of the hot glass by the fan, the pressure thus being kept just sufficiently uniform to expand the cylinder to the exact degree intended at the beginning of the draw and keep it expanded to such degree throughout the entire length of the draw. There being at all times a continual downward flow of fresh air progressively and uniformly heated and a continual upflow of air which is to like degrees progressively and uniformly cooled, it will be evident that the outer column of air will be reduced in temperature from the bottom upward, without any substantial variation of pressure, to accord with the temperature of the glass as it decreases on being drawn outward and away from the bath of molten glass, so that no pulsations or fluctuations of pressure can occur. As a result, it has been found that cylinders of greater length and diameter may be drawn than it is possible to draw under ordinary processes and with ordinary apparatus, without decrease of quality over the most efficient methods, by means of which the output of the drawing apparatus is materially increased and the cost of production correspondingly decreased.

In order to center and support the air tube and blower coaxially within the cylinder 22 and prevent such tube from swinging or oscillating, a centering device 23 is employed, said device comprising a circular supporting member 23' which may be of concavo-convex form and comprises a series of segmental plates 24 pivoted to the outer surface of the tube 13, as indicated at 25, to swing in a vertical direction, said plates being arranged in under and overlapping relation with respect to each other so as to open and close, fan-fashion, as they are raised and lowered so that a circular support of different diameters may be produced. The radial plates are adjustably connected by means of links 26 with a collar or sleeve 27 slidably mounted upon the exterior of the tube and connected with a cable 28 leading to a drum 29 whereby the sleeve may be drawn upon to fold the blades of the support upwardly against the sides of the tube, as shown in Fig. 2, said blades and coöperating parts being adapted to fall and maintain an open position by gravity when the cable is relaxed. Certain of the blades of the support carry friction wheels or rollers 30 which are arranged, in the drawing action, by proper adjustment of the support to bear lightly against the inner surface of the cylinder 22, thus staying and supporting the tube 13 against oscillating motion and accordingly maintaining it at all times in a coaxial and centered position with relation to the cylinder, as will be readily understood.

While the construction disclosed is preferred in the production of an apparatus for carrying the invention into practical effect, it is to be understood that suitable equivalent means, falling within the scope of the appended claims, may be employed without departing from the spirit or sacrificing any of the advantages of the invention.

I claim:—

1. In an apparatus for drawing glass cylinders, a drawing tool including a hollow bait, an air supply tube along which the hollow bait is movable during the drawing action, said tube being relatively short with respect to the length of the cylinder that is to be drawn and said tube being open to the atmosphere through the hollow bait during a considerable portion of the time that the drawing action is in progress, a suction and discharge fan arranged within the lower end of said tube for drawing air into the top of the tube and discharging it at the bottom of the tube, and means for driving said fan.

2. In an apparatus for drawing glass cylinders, a drawing tool including a hollow bait, a short air supply tube, means for raising and lowering the same, and for suspending it below the bait and wholly within the cylinder after the drawing of the latter has progressed to a predetermined stage, means for operating the drawing tool, a suction and discharge fan within the tube, and a motor carried by the tube for driving said fan.

3. In an apparatus for drawing glass cylinders, a drawing tool including a hollow bait, a short air supply tube, means for raising and lowering the same, and for suspending it below the bait and wholly within the cylinder after the drawing of the latter has progressed to a predetermined stage, means for operating the drawing tool, a suction and discharge fan within the tube, an electric motor within the tube for driving said fan, and means for supplying electric current to said motor.

4. In an apparatus for drawing glass cylinders, a drawing tool including a hollow bait, a short air supply tube, means for raising and lowering the same, and for suspending it below the bait and wholly within the cylinder after the drawing of the latter has progressed to a predetermined stage, means for operating the drawing tool, a suction and discharge fan within the tube, a motor carried by the tube for driving said fan, and means for centering the tube within the cylinder which is being drawn.

5. In an apparatus for drawing glass cylinders, a drawing tool including a hollow bait, a short air supply tube, means for raising and lowering the same, and for suspending it below the bait and wholly within the cylinder after the drawing of the latter has progressed to a predetermined stage, means for operating the drawing tool, a suction and discharge fan within the tube, an electric motor within the tube for driving said fan, means for supplying electric current to said motor, and means for centering the tube within the cylinder which is being drawn.

6. In an apparatus for drawing glass cylinders, the combination of a vertically movable hollow bait, means for raising and lowering the same, a short air supply tube, means for raising and lowering the same, and for suspending it below the bait and wholly within the cylinder after the drawing of the same has progressed to a predetermined stage, a suction and discharge fan within the lower end of said tube, a motor carried by the tube for driving said fan, a collapsible centering device surrounding the tube and comprising a series of folding segments, and means for controlling the same.

7. In an apparatus for drawing glass cylinders, a vertically movable bait comprising a hollow body having openings in the top and bottom walls thereof, a short air supply tube along which the bait is movable during a portion of the draw, means for supporting said tube below the bait and wholly within the cylinder after the drawing of the latter has progressed to a predetermined stage, means for supplying air through the lower end of the tube to the bottom of the cylinder, and means for centering said tube from and with relation to said cylinder.

In testimony whereof I affix my signature in presence of two witnesses.

WILLIAM WESTBURY.

Witnesses:
A. L. NIXON,
J. T. PANCOAST.

Copies of this patent may be obtained for five cents each, by addressing the "Commissioner of Patents, Washington, D. C."